Patented Oct. 25, 1949

2,485,691

UNITED STATES PATENT OFFICE 2,485,691

PRODUCTION OF EXTRUDED POLYTETRAFLUOROETHYLENE ARTICLES

Stephen Bernard Bogese, Upper Montclair, N. J., assignor to E. I. du Pont de Nemours & Company, Wilmington, Del., a corporation of Delaware No Drawing. Application February 20, 1948, Serial No. 9,943

4 Claims. (Cl. 18—59)

The invention relates to a method of preparing improved polytetrafluoroethylene articles and more particularly to a method of preparing various polytetrafluoroethylene articles having superior properties by means of an extrusion method.

Methods of preparing polytetrafluoroethylene are disclosed in U. S. Patent 2,230,654, U. S. Patent 2,393,967, and U. S. Patent 2,394,243. Polytetrafluoroethylene is a polymeric material highly resistant to corrosion and oxidation, and is exceedingly valuable for the manufacture into commercially useful articles.

Heretofore, useful articles have been fabricated from tetrafluoroethylene polymer by batch-wise processes and by a continuous extrusion process for the fabrication of rods, tubes, and coated articles, as described in pending application S. N. 691,406, filed on August 17, 1946, by A. J. Cheney, now U. S. Patent No. 2,456,621, wherein finely divided polytetrafluoroethylene is prebaked at a temperature of 300° C. to 500° C. before extrusion through a die in which the polymer is sintered at a temperature above 327° C. while passing through the said die.

An object of this invention is to provide polytetrafluoroethylene articles having superior properties. A further object is to provide a polytetrafluoroethylene coating on objects such as wires and the like having unusually long life under high dielectric stress as well as being uniform, continuous, flexible and tough. Other objects will be apparent from the detailed description of the invention given hereinafter.

The above objects are accomplished according to this invention by intimately mixing finely divided unbaked polytetrafluoroethylene with finely divided polytetrafluoroethylene prebaked at a temperature of 300° C. to 500° C. in such proportions that the resulting mixture will contain from 25 percent to 95 percent prebaked polytetrafluoroethylene powder; passing said mixture through a die having an internal contour of substantially the size and shape of the desired finished article; and baking the polymer while passing through the die at a temperature above 327° C. until sintered. In extruding a coating of this polymer on objects such as wires and the like, the object to be coated is fed into an extruder and carried along the path of the extruding polymer by the tensional pull of the polymer thereon. The said finely divided unbaked polytetrafluoroethylene, hereinafter known as unbaked polytetrafluoroethylene powder, is the product of the process described in application S. N. 714,811, filed December 7, 1946, by W. D. McKinley, or is the dried suspensoid of the process described in application S. N. 713,385, filed November 30, 1946, by M. M. Renfrew.

It is advantageous, although not essential, to heat the polymer mixture before passing the same through the die. This pre-heating step, which materially shortens the time required for the entire operation by decreasing the time required in the subsequent baking step, may be accomplished in the extruding mechanism by conventional heating means at a temperature below 327° C. and preferably at a temperature of approximately 200° C. to 300° C.

It has been found that by mixing unbaked finely divided polytetrafluoroethylene powder and prebaked finely divided polytetrafluoroethylene in such proportions that the resulting mixture will contain from 25 percent to 95 percent finely divided prebaked polytetrafluoroethylene, the said mixture can be as readily fed into an extruding machine as the prebaked polymer itself, whereas it is impractical to feed unbaked polymer to such an extruding machine. While any blend in the above range may be used, it is preferred that the resulting mixture contain prebaked polymer in an amount of from 40 percent to 90 percent by weight of the mixture. The properties of the extruded articles obtained from the above polymer mixture are greatly superior to those articles extruded from the prebaked polymer composition, and this improvement is most readily observed by measurement of the electrical properties of coated electrical conductors. The order and magnitude of the improvement in electrical properties is illustrated by the following examples:

*Example I*

Polytetrafluoroethylene powder, prebaked for 60 minutes at 380° C., was mixed with unbaked polytetrafluoroethylene powder so that the resulting mixture contained 85 percent by weight of prebaked finely divided polytetrafluoroethylene. The blend was fed into a screw stuffer maintained at a temperature of 315° C. to which a cross-head was attached. The screw stuffer extruded the blend into the cross-head and then into a 0.298-inch diameter mild steel tubular die. Into this die through said cross-head was introduced 7 strands of silverplated copper wire which had been twisted together to form a 0.086-inch diameter stranded wire conductor. The cross-head and the 26-inch long baking zone of the die were maintained at a temperature of 400° C. The extrusion rate of the 0.275-inch diameter coated conductor was at the rate of 8 feet per hour.

A sample of this coated conductor was subjected to an electrical stress of 18,000 volts for more than 180 minutes before failure of the coating occurred. A conductor, coated with polytetrafluoroethylene which had been prebaked for 60 minutes at 380° C. and not mixed with any unbaked polymer was subjected to the same electrical stress and failure of the coating resulted in 0.1 minute.

Example II

A center hole 0.093-inch in diameter was drilled along the longitudinal axis of the screw stuffer of Example I. A mild steel tubular die 0.298-inch in diameter was attached to the screw stuffer in such a manner that the die will have a common axis with the screw. Polytetrafluoroethylene powder prebaked at 300° C. for 8 hours was blended with unbaked polytetrafluoroethylene powder so that the resulting mixture contains 75 percent by weight of the prebaked polytetrafluoroethylene. The blend was then fed into the screw stuffer. Stranded wire of the type used in Example I was fed into the center hole of the screw until the wire reached the point at which the polymer was passing from the screw stuffer into the die, then the wire was carried through the die by the polymer. The 18-inch long baking zone of the die can be maintained at a temperature of 480° C. The 0.275-inch diameter coated conductor may be extruded at the rate of 12 feet per hour.

A sample of this coated conductor may be subjected to an electrical stress of 18,000 volts for 152 minutes before failure results, while the time for failure of a coated conductor prepared under identical conditions from polytetrafluoroethylene powder prebaked for 8 hours at 300° C. and not mixed with non-baked finely divided polytetrafluoroethylene was 0.2 minute.

The following examples are specific illustrations as to the continuous extrusion of rods and tubes.

Example III

Polytetrafluoroethylene powder, prebaked for 30 minutes at 380° C. was blended with unbaked polytetrafluoroethylene powder in such a proportion so that the resulting mixture constitutes 90 percent by weight of the mixture of finely divided prebaked polytetrafluoroethylene powder. The polymer blend was fed into a screw stuffer to which is attached a 1-inch diameter steel tubular die having a baking zone 24-inches long which was maintained at a temperature of 380° C. A rod ⅞-inch in diameter was extruded at the rate of 3 feet per hour.

Example IV

Polytetrafluoroethylene powder, prebaked at 360° C. for one hour, was blended with unbaked finely divided polytetrafluoroethylene in such a proportion that the resulting mixture contained 40 percent by weight of the mixture of finely divided prebaked polytetrafluoroethylene powder. The blend was fed into a screw stuffer which extruded the powder into a die designed for the production of tubes. This die comprises a steel tube 1¾-inches inside diameter having a ⅜-inch diameter metal core suspended therein. The 18-inch long baking zone of the die was maintained at a temperature of 380° C. A polytetrafluoroethylene tube 1⅝-inches outside diameter by ⅜-inch inside diameter was extruded at the rate of 2 feet per hour.

It is to be understood that the above examples are merely illustrative of the embodiments of this invention and that the invention broadly comprises blending finely divided unbaked polytetrafluoroethylene powder with finely divided polytetrafluoroethylene prebaked at a temperature of 300° C. to 500° C. in such proportions that the resulting mixture will contain from 25 percent to 95 percent finely divided prebaked polytetrafluoroethylene powder, passing this blended polymer mixture and the object to be coated if a coating operation is involved, simultaneously through a die having an internal contour of substantially the size and shape of the desired finished article, and baking the polymer while passing through the die at a temperature above 327° C. but not in excess of 500° C. It is preferred that the mixture contain the finely divided prebaked polymer in an amount of from 40 percent to 90 percent by weight of the mixture.

The extrusion of unbaked polymer is most desirable, however, it has not been found possible to feed unbaked finely divided polytetrafluoroethylene into an extruding mechanism because of the inherent resistance to flow of the finely divided particles of the unbaked polymer which prevent the feeding of the polymer into the screw stuffer. By the addition to the unbaked polytetrafluoroethylene powder of at least 25 percent by weight of the resulting mixture of prebaked polytetrafluoroethylene powder the mixture feeds satisfactorily into the screw stuffer.

The dies referred to herein usually serve the simultaneous dual purpose of dies and baking zones, the polymer being baked while passing through the heated die. However, the baking zone may include more than one section having the same or different inside diameters and maintained at the same or different temperatures. In the event that two or more sections of different diameters are employed, the smallest diameter section is normally placed nearest the extruder and serves as a die and baking zone, while the larger diameter sections serve primarily as baking zones.

The baking step is essentially a sintering operation, while sintering may or may not be accomplished in the prebaking step. To sinter the polytetrafluoroethylene, the temperature must be raised above 327° C. There is no particular advantage however, in exceeding a temperature of 500° C.; more often it is disadvantageous, and usually the sintering can be effected more satisfactorily at a considerably lower temperature. The heating operations involved in this invention may be accomplished by means of electric heaters, gas heaters, a liquid, e. g. hot oil, a molten metal or alloy, or a mixture of molten inorganic salts. Electric heaters are preferred especially for carrying out the baking step.

An essential feature of this invention is the blending of prebaked and unbaked polytetrafluoroethylene. While it has not been found possible to practically extrude unbaked polytetrafluoroethylene into articles of uniform density characterized by freedom from flaws, prebaked polymer is extruded into articles of uniform density. However, these articles formed from prebaked polytetrafluoroethylene per se have physical properties inferior to the articles obtained by the extrusion of a mixture containing unbaked and prebaked polymer powder in such proportions that the resulting mixture will contain from 25 percent to 95 percent prebaked polytetrafluoroethylene powder.

It has been found that although the powdered mixture of prebaked and unbaked polytetrafluoroethylene polymer may be extruded through the die by means of a ram moving in a reciprocating manner and forcing the powder directly into the die, a preferred method of accomplishing this step is by means of a screw stuffer. As the polytetrafluoroethylene mixture is being extruded through the die, there is a tendency to form loosely compacted articles because of insufficient compacting pressure. This tendency is overcome by using a longer die or by applying a mechanical break to the article being extruded after it leaves the die. Although this compacting pressure is not critical over a very wide range of pressure, e. g. about 50 to 10,000 pounds per sq. inch, this pressure and particularly the minimum pressure does have some bearing on the quality of articles produced. The upper pressure which may be employed is limited perhaps more by the strength of the apparatus used than any other factor. The pressure to be employed will depend somewhat on the type of article being produced. A suitable pressure under the circumstances employed may be readily determined by those skilled in the art.

The process of the present invention is applicable both to the polytetrafluoroethylene mixture per se and to mixtures of the said polytetrafluoroethylene mixture with other components such as finely divided copper, tin, iron, lead, brass, bronze, graphite, asbestos, silica, calcium chloride, calcium fluoride, sodium fluoride, ammonium chloride, ammonium nitrate, titanium dioxide or the like. These additive materials are usually added in the powder form, but in some instances, can be added in the form of fibers, for example, asbestos, glass, and the like.

The process is also applicable to copolymers of tetrafluoroethylene with other polymerizable compounds such as isobutylene or ethylene and particularly copolymers containing substantial amounts of tetrafluoroethylene although more convenient means may be available for fabricating articles from copolymers, especially those containing a relatively small portion of tetrafluoroethylene.

A further application of the tubes and rods produced according to the instant invention is for the making of sheets by placing the articles in a lathe or sheeting machine and turning off a continuous sheet of material. The articles are well suited for this purpose because they are uniform in size and shape and because there is no waste due to flaws in the said articles. Of course, the articles may be made in various sizes for subjection to subsequent sheeting and the like operations.

As will be apparent, semi-finished articles may be produced according to this invention and thereafter machined or otherwise treated to give the desired finished articles. Further, the finished articles of the instant invention may be made into more complex shapes or otherwise modified by machining or treating in other ways to give the desired finished articles.

Another advantage of this invention is that scrap polytetrafluoroethylene, resulting from articles produced by this or other methods in which temperatures above 327° C. but not in excess of 500° C. were employed, may be finely divided and used instead of or as part of the prebaked polymer for making articles according to the present invention, thus providing a process for utilizing scrap polytetrafluoroethylene which was heretofore discarded.

As many apparently widely different embodiments of this invention may be made without departing from the spirit and scope thereof, it is to be understood that the invention is not limited to the specific embodiments thereof except as defined in the appended claims.

I claim:
1. A process for making polytetrafluoroethylene articles which comprises mixing finely divided unbaked polytetrafluoroethylene with finely divided polytetrafluoroethylene prebaked at a temperature of 300° C. to 500° C. in such proportions that the resulting mixture will contain from 25 percent to 95 percent by weight of said prebaked polytetrafluoroethylene; passing the said mixture through a die under compacting pressure, the said die having an internal contour of substantially the size and shape of the desired finished article; and baking the said polytetrafluoroethylene at a temperature between 327° C. and 500° C. until sintered.

2. A process for making polytetrafluoroethylene articles which comprises mixing finely divided unbaked polytetrafluoroethylene with finely divided polytetrafluoroethylene prebaked at a temperature of 300° C. to 500° C. in such proportions that the resulting mixture will contain from 25 percent to 95 percent by weight of said prebaked polytetrafluoroethylene, passing the said mixture through a die under compacting pressure, the said die having an internal contour of substantially the size and shape of the desired finished article; and baking the said polytetrafluoroethylene while passing through the die, at a temperature between 327° C. and 500° C. until sintered.

3. A process for coating objects with polytetrafluoroethylene which comprises mixing finely divided unbaked polytetrafluoroethylene with finely divided polytetrafluoroethylene prebaked at a temperature of 300° C. to 500° C. in such proportions that the resulting mixture will contain from 25 percent to 95 percent by weight of said prebaked polytetrafluoroethylene; simultaneously passing the said polytetrafluoroethylene mixture and the object to be coated through a die under compacting pressure, the said die having an internal contour of substantially the size and shape of the desired finished object; and baking the said polytetrafluoroethylene while passing through the die, at a temperature between 327° C. and 500° C. until sintered.

4. A process for coating wire with polytetrafluoroethylene which comprises mixing finely divided unbaked polytetrafluoroethylene with finely divided polytetrafluoroethylene prebaked at a temperature of 380° C. in such proportions that the resulting mixture contains 85 percent by weight of prebaked polytetrafluoroethylene powder; heating the said mixture to a temperature of 315° C., simultaneously passing the said heated polytetrafluoroethylene mixture and the said wire through a die under compacting pressure, the said die having an internal contour of substantially the size and shape of the finished article; and baking the said polytetrafluoroethylene while passing through the die, at a temperature between 327° C. and 500° C. until sintered.

STEPHEN BERNARD BOGESE.

REFERENCES CITED

The following references are of record in the file of this patent:

UNITED STATES PATENTS

| Number | Name | Date |
| --- | --- | --- |
| 2,400,091 | Alfthan | May 14, 1946 |

OTHER REFERENCES

Yelton, "Telflon," Plastics and Resins, May 1946, pages 14–16 and 36.